UNITED STATES PATENT OFFICE.

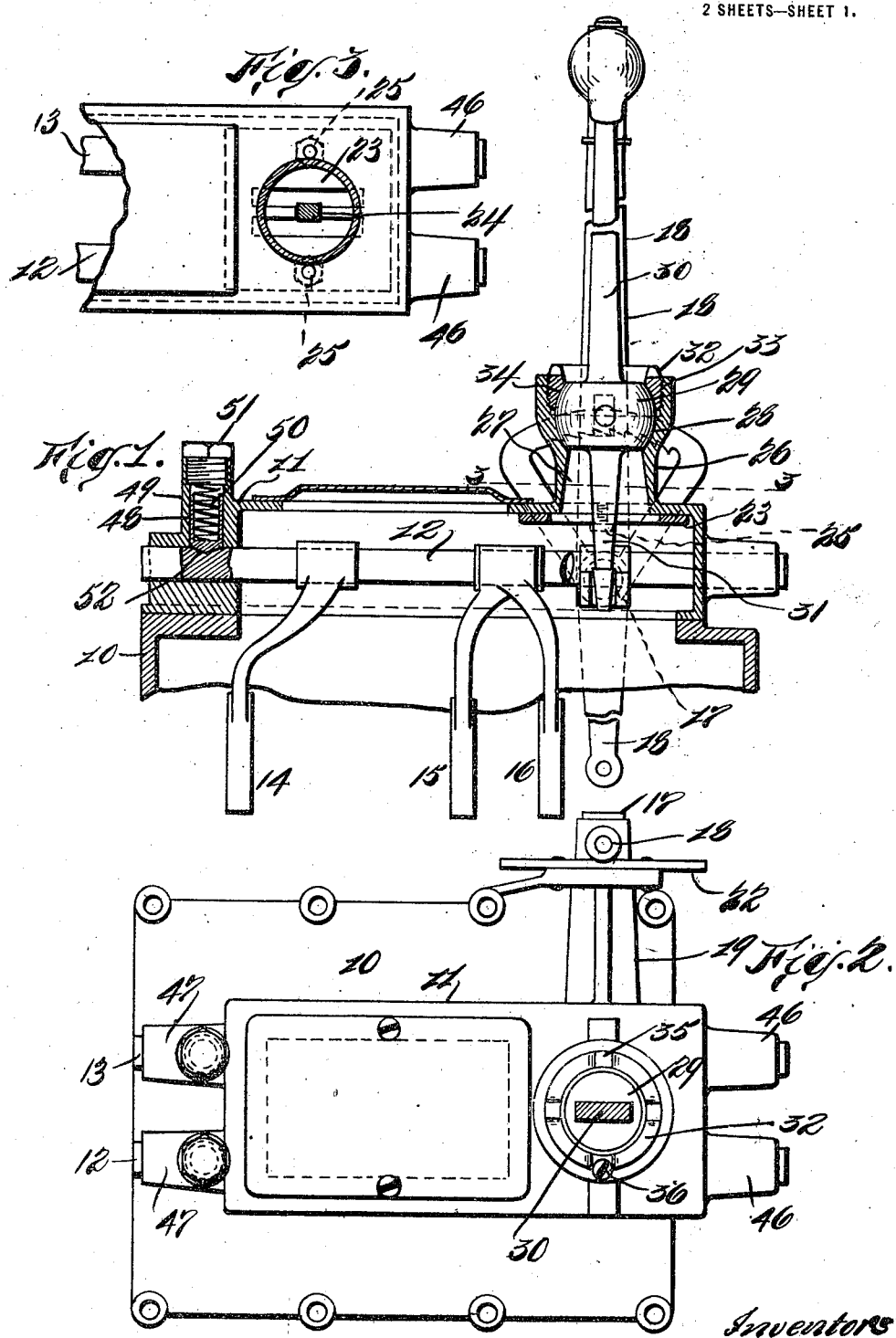

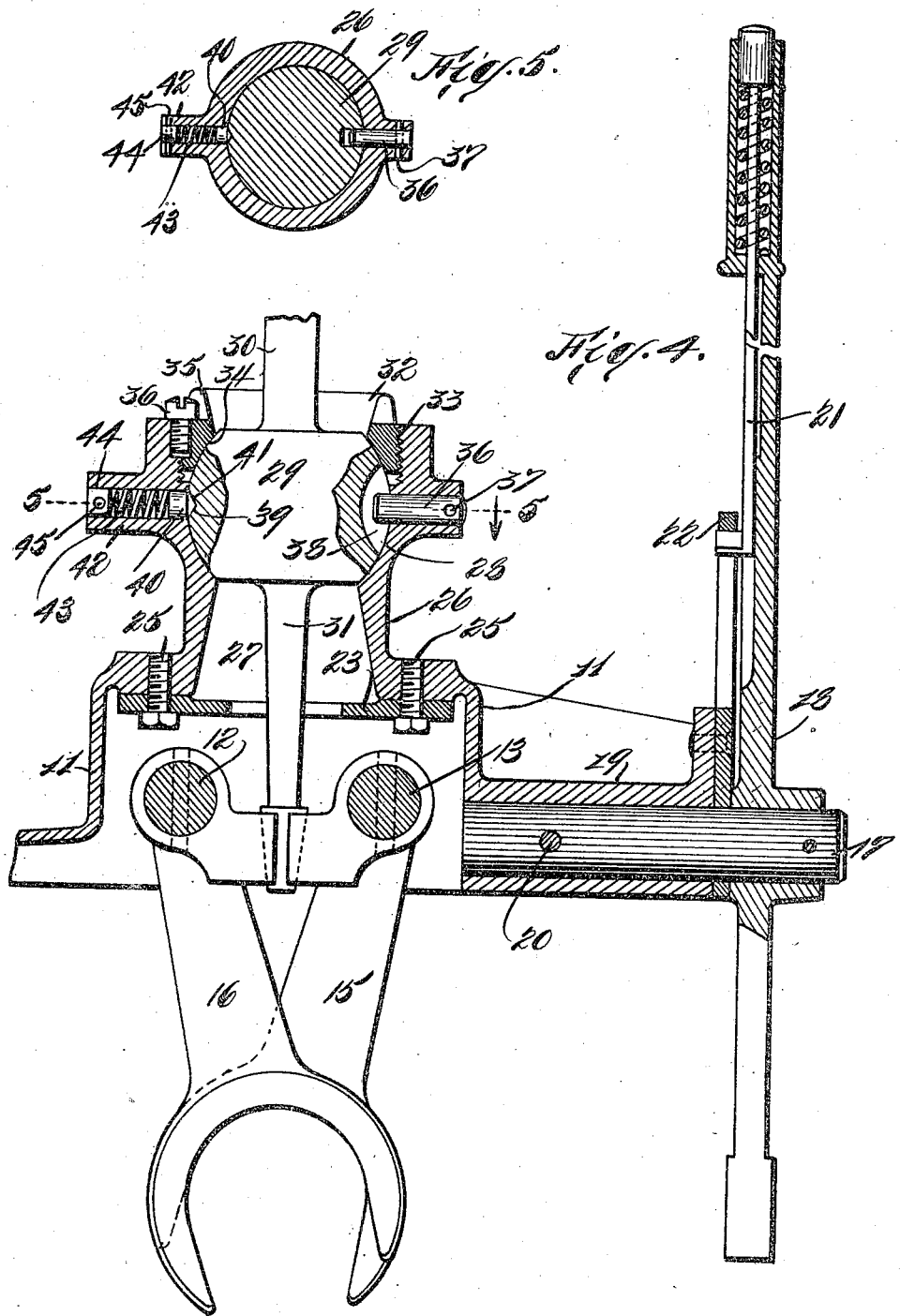

JOHN F. DODGE, OF DETROIT, AND HORACE E. DODGE, OF GROSSE POINTE, MICHIGAN, ASSIGNORS TO DODGE BROTHERS, OF DETROIT, MICHIGAN, A CORPORATION OF MICHIGAN.

GEAR-SHIFTING MECHANISM.

1,172,881.

Specification of Letters Patent. Patented Feb. 22, 1916.

Application filed October 2, 1914. Serial No. 864,594.

*To all whom it may concern:*

Be it known that we, JOHN F. DODGE and HORACE E. DODGE, citizens of the United States, residing at Detroit, Michigan, and Grosse Pointe, Michigan, respectively, have invented certain new and useful Improvements in Gear-Shifting Mechanism, of which the following is a clear, full, and exact description.

This invention relates to improvements in control or gear shifting mechanism for the change gears of motor driven conveyances such as automobiles.

One of the objects of the present invention is to provide a unit which is removable from the transmission casing, and which comprises a cover for such casing, gear shifting rods, control mechanism, and a brake lever mounted on said cover.

Another object of the invention is to simplify the construction of the gear shifting mechanism, by for instance omitting flat springs.

Other objects of the invention are to provide means for holding the control lever and associated parts against rattling, to provide an oil and dust-proof unit, and to provide parts which are very accessible and easy to manufacture and to assemble.

These being among the objects of the present invention, the same consists of certain features of construction and combinations of parts to be hereinafter described and then claimed with reference to the accompanying drawings illustrating a suitable embodiment of the invention and in which—

Figure 1 is a sectional view partly in elevation, illustrating the preferred construction; Fig. 2 is a plan view of the same parts, but the control lever is in section; Fig. 3 is a sectional plan view partly broken away, on the line 3—3 Fig. 1; Fig. 4 is an enlarged section at right-angles to Fig. 1, showing also the brake lever; and Fig. 5 is a transverse section on the line 5—5 Fig. 4.

Referring to the drawings, the transmission casing 10 shown in Fig. 1 is provided with a removable cover 11 secured thereto in any suitable manner. This cover is preferably made in the form of a cap and the side flanges thereof are provided with means for guiding sliders or slide rods 12, 13, on which are located the shifting forks 14, 15, 16 for the change gears (not shown). Said cover 11 is provided at one side with a pin 17 on which is journaled the brake lever 18, said pin being received at its inner end in a sleeve 19, and being pinned to said sleeve by means of a cotter-pin or the equivalent 20. The brake lever may be of any suitable construction and is provided with a latch 21 having a pawl adapted to engage with the brake lever quadrant 22. It will be noticed that the brake lever is mounted on the said cover 11 and is removed with the cover.

To the upper wall of the cover 11 the H-plate 23 is secured as by means of screw bolts 25, said H-plate being provided with a transverse slot 24, Fig. 3, corresponding with the neutral position of the control lever. Rising from the top wall of the cover 11 is a neck or pedestal 26 which is made hollow in order to provide a throat 27 which extends upwardly above the slotted portion of the H-plate. Pedestal 26 is at its upper end provided with a socket 28, the inner surface of which is spherical, and said socket receives a ball or spherical head 29 on the control lever 30, which latter is provided with a downwardly extending stem 31 which passes through the slotted portion of the H-plate and engages with well known parts on the sliders 12, 13. A collar or castellated nut 32 is located at the upper end of the pedestal 26 and has screw connection therewith at 33, and said collar also has a spherically formed surface at 34, so that when said collar is screwed into the upper end of the pedestal it will engage with the ball or spherical head 29, whereby a complete ball and socket joint is provided. It will be observed that by unscrewing the collar 32 the control lever may be removed, and it can just as readily be assembled with the associated parts. The notches or recesses 35 of said collar are adapted to constitute seats for the head of a screw which is screwed into the adjacent portions of the collar and pedestal at the screw joint connection 33, a part of the threaded opening which receives the screw, being formed in the nut or collar 32 and the other part being formed in the pedestal 26, whereby said screw serves to lock the said collar 32 in position after it has once been set.

It will be seen from the above description that the control lever 30 is removable together with the cover 11 and the brake lever 18, and that by operating the control lever in well known manner the shifting of the change gears may be attained. To prevent twisting of the control lever on its longitudinal axis some suitable device is preferably provided such as a pin 36 which is secured in the pedestal 26 at right-angles to the control lever by means of a cotter-pin or the like 37, and the stud end of said pin 36 projects into the chamber of the socket 28 and into a segmental slot or groove 38 cut vertically into the adjacent wall of the ball 29. It will be noted that whether the control lever is shifted to the right or to the left of the position shown in Fig. 4, said pin will be in engagement with said slot 38 and will prevent twisting of the control lever.

An anti-rattling device is also preferably provided, to which end the ball or spherical head 29 is formed with a concavity or recess 39 at a point diametrically opposite to the center of the slot 38, and said recess is engaged by a pin 40, the point 41 of which is preferably tapered while the said recess is correspondingly tapered. The said pin 40 is guided in a sleeve 42 on the pedestal 26 and is constantly urged forward toward the ball 29 by means of a helical spring 43 located in said sleeve 42 and held therein by means of a plug 44 secured to the said sleeve as by means of a pin 45. It will be seen that, when the control lever is in central or neutral position, the projecting end of the pin 40 will be in engagement with the recess 39 of the ball 29 and thereby prevent rattling of the so locked parts.

Cover plate 11 is preferably provided at its opposite ends with guide sleeves 46 and 47 for the sliders 12 and 13, and suitable means are preferably provided for locking each slider in set position. To this end, as shown in Fig. 1, a pin 48 is guided vertically in a guide 49 at one end of the cover 11, and said pin is hollow, or in other words it is in the nature of a shell, and receives a spring 50, the lower end of which bears against the lower end of said pin, while said spring and pin are held in the guide by means of a screw plug 51. Preferably the lower end of the pin 48 is tapered and said tapered end is adapted to engage in a recess or notch 52 in slider 12 or 13 as the case may be.

It is obvious that this invention is susceptible of modification, as parts may be omitted, parts added and parts substituted without departing from the invention as expressed in the claims.

What we claim as new is:—

1. In gear shifting mechanism, the combination of a lever support, a control-lever, a ball-and-socket joint between said lever and support, and an anti-rattling device applied to said joint, comprising a spring-pressed locking member mounted on said socket, said ball having a recess for receiving the end of said member.

2. In gear shifting mechanism, the combination of a lever support provided with a throat, a control-lever extending through said throat, a ball-and-socket joint between said lever and support, and an anti-rattling device applied to said joint, comprising a spring-pressed pin mounted on said socket, said ball having a recess for receiving the end of said pin.

3. In gear shifting mechanism, the combination of a transmission case cover provided with a hollow pedestal, a ball-and-socket joint between said lever and pedestal, said socket comprising two parts, respectively an extension from said pedestal and a nut or collar having a screw connection with said extension, means for preventing twisting of said lever, and comprising a stud projecting from said socket and a slot in said ball for engagement by said stud, and an anti-rattling device applied to said joint and comprising a spring-pressed pin on said socket and a recess in said ball, for the engagement of said pin.

4. In a gear shifting mechanism, the combination of a lever support provided with a throat, a control lever extending through said throat, a ball-and-socket joint between said lever and support, an anti-rattling device applied to said joint, and means diametrically opposite said anti-rattling device for preventing twisting of said lever.

5. In a gear shifting mechanism, the combination of a lever support provided with a throat, a control lever extending through said throat, a ball-and-socket joint between said lever and support, an anti-rattling device applied to said joint, and means diametrically opposite said anti-rattling device for preventing twisting of said lever, said device and said means both comprising pins which project into said socket and engage said ball.

Signed at Detroit, Michigan, this 17th day of September, 1914.

JOHN F. DODGE.
HORACE E. DODGE.

Witnesses:
W. R. WILSON,
G. W. MASON.